US006244344B1

(12) United States Patent
Chatterji et al.

(10) Patent No.: US 6,244,344 B1
(45) Date of Patent: Jun. 12, 2001

(54) METHODS AND COMPOSITIONS FOR CEMENTING PIPE STRINGS IN WELL BORES

(75) Inventors: Jiten Chatterji, Duncan; Roger S. Cromwell, Walters; Robert D. Kuhlman; Bobby J. King, both of Duncan, all of OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/247,813

(22) Filed: Feb. 9, 1999

(51) Int. Cl.$^7$ .................................................. E21B 33/14
(52) U.S. Cl. ................................. 166/295; 523/130
(58) Field of Search ..................... 166/292–295; 523/130

(56) References Cited

U.S. PATENT DOCUMENTS

| | | | |
|---|---|---|---|
| 2,815,079 | 12/1957 | Goins, Jr. et al. | 166/29 |
| 3,082,823 | 3/1963 | Hower et al. | 166/29 |
| 3,208,525 | 9/1965 | Caldwell et al. | 166/33 |
| 3,310,111 | 3/1967 | Pavlich et al. | 166/33 |
| 3,416,604 | 12/1968 | Rensvold | 166/33 |
| 3,467,208 | 9/1969 | Kelly, Jr. | 175/72 |
| 3,612,181 | 10/1971 | Brooks, Jr. | 166/295 |
| 3,750,768 | 8/1973 | Suman, Jr. et al. | 175/72 |
| 3,782,466 | 1/1974 | Lawson et al. | 166/254 |
| 3,894,977 | 7/1975 | Brown et al. | 260/18 EP |
| 3,933,204 | 1/1976 | Knapp | 166/295 |
| 3,960,801 | 6/1976 | Cole et al. | 260/33.6 EP |
| 3,976,135 | 8/1976 | Anderson | 166/276 |
| 4,042,031 | 8/1977 | Knapp | 166/276 |
| 4,042,032 | 8/1977 | Anderson et al. | 166/276 |
| 4,072,194 | 2/1978 | Cole et al. | 166/295 |
| 4,101,474 | 7/1978 | Copeland et al. | 260/13 |
| 4,107,112 * | 8/1978 | Latta, Jr. et al. | 260/18 EP |
| 4,113,015 | 9/1978 | Meijs | 166/276 |
| 4,127,173 | 11/1978 | Watkins et al. | 166/276 |
| 4,189,002 | 2/1980 | Martin | 166/295 |
| 4,199,484 | 4/1980 | Murphey | 260/13 |
| 4,215,001 | 7/1980 | Elphingstone et al. | 252/8.55 C |
| 4,216,829 | 8/1980 | Murphey | 166/276 |
| 4,220,566 | 9/1980 | Constien et al. | 260/13 |
| 4,272,384 | 6/1981 | Martin | 252/8.55 R |
| 4,336,842 | 6/1982 | Graham et al. | 166/276 |
| 4,339,000 | 7/1982 | Cronmiller | 166/295 |
| 4,367,300 * | 1/1983 | Aoki et al. | 524/2 |
| 4,368,136 | 1/1983 | Murphey | 252/316 |
| 4,477,626 | 10/1984 | Suzuki | 524/862 |
| 4,483,888 | 11/1984 | Wu | 427/336 |
| 4,489,785 | 12/1984 | Cole | 166/295 |
| 4,532,052 | 7/1985 | Weaver et al. | 252/8.55 R |
| 4,537,918 | 8/1985 | Parcevaux et al. | 523/130 |
| 4,558,075 | 12/1985 | Suss et al. | 523/216 |
| 4,620,993 | 11/1986 | Suss et al. | 427/407.1 |
| 4,665,988 | 5/1987 | Murphey et al. | 166/295 |
| 4,741,401 | 5/1988 | Walles et al. | 166/300 |
| 4,767,460 | 8/1988 | Parcevaux et al. | 106/90 |
| 4,773,482 | 9/1988 | Allison | 166/270 |
| 4,785,884 | 11/1988 | Armbruster | 166/280 |
| 4,829,100 | 5/1989 | Murphey et al. | 523/131 |
| 4,921,047 | 5/1990 | Summers et al. | 166/276 |
| 4,972,906 | 11/1990 | McDaniel | 166/276 |
| 5,090,478 | 2/1992 | Summers | 166/278 |
| 5,095,987 | 3/1992 | Weaver et al. | 166/276 |
| 5,107,928 | 4/1992 | Hilterhaus | 166/293 |
| 5,133,409 | 7/1992 | Bour et al. | 166/293 |
| 5,159,980 | 11/1992 | Onan et al. | 166/294 |
| 5,162,060 | 11/1992 | Bredow et al. | 106/808 |
| 5,168,928 | 12/1992 | Terry et al. | 166/291 |
| 5,211,234 | 5/1993 | Floyd | 166/276 |
| 5,213,161 | 5/1993 | King et al. | 166/293 |
| 5,232,961 | 8/1993 | Murphey et al. | 523/414 |
| 5,258,072 | 11/1993 | Gopalkirshnan et al. | 106/802 |
| 5,293,938 | 3/1994 | Onan et al. | 166/293 |
| 5,314,023 | 5/1994 | Dartez et al. | 166/295 |
| 5,335,726 | 8/1994 | Rodrigues | 166/295 |
| 5,337,824 | 8/1994 | Cowan | 166/293 |

(List continued on next page.)

FOREIGN PATENT DOCUMENTS

| | | | |
|---|---|---|---|
| 0 091 377 | 10/1983 | (EP) | E21B/33/13 |
| 522931 | 1/1993 | (EP) . | |
| 0 553 566 A1 | 8/1993 | (EP) | E21B/43/04 |
| 786439 | 7/1997 | (EP) . | |
| 0 802 253 | 10/1997 | (EP) | C09K/7/02 |
| 1315462 | 12/1962 | (FR) . | |
| 1019122 | 2/1966 | (GB) | E02D/3/14 |
| 05032444 | 2/1993 | (JP) . | |
| WO 91/02703 | 3/1991 | (WO) | C04B/24/24 |
| WO 94/12445 | 6/1994 | (WO) | C04B/26/18 |

OTHER PUBLICATIONS

Abstract No. XP002145741 dated Mar. 12, 1996; Derwent Publications, Ltd.
Abstract No. XP002145742 dated Apr. 15, 1993; Derwent Publications, Ltd.
Paper entitled "Conditioning of Spent Ion Exchange Resins By Embedding In Compound Matrixes" by C.J. Kertesz; Waste Management, Tucson, Arizona, 1991, vol. 2, pp. 381–386.
Abstract No. XP002146282 dated Oct. 15, 1982; Derwent Publications, Ltd.
Abstract No. XP002146283 Oct. 12, 1977; Derwent Publications, Ltd.

Primary Examiner—William Neuder
Assistant Examiner—Zakiya Walker
(74) Attorney, Agent, or Firm—Craig W. Roddy; C. Clark Dougherty, Jr.

(57) ABSTRACT

The present invention provides improved methods and compositions for cementing pipe strings in well bores. The methods of the invention are basically comprised of preparing a cement composition comprised of a hydraulic cement, an epoxy resin, a hardening agent for the epoxy resin and sufficient water to form a pumpable slurry. Thereafter, the cement composition is introduced into the annulus between a pipe string and a well bore and the cement composition is allowed to set into a resilient impermeable solid mass.

10 Claims, No Drawings

U.S. PATENT DOCUMENTS

| | | | |
|---|---|---|---|
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,363,918 | 11/1994 | Cowan et al. | 166/295 |
| 5,368,102 | 11/1994 | Dewprashad et al. | 166/276 |
| 5,373,901 | 12/1994 | Norman et al. | 166/300 |
| 5,377,757 | 1/1995 | Ng | 166/277 |
| 5,388,648 | 2/1995 | Jordan, Jr. | 166/380 |
| 5,428,178 | 6/1995 | Zuzich et al. | 549/378 |
| 5,458,195 | 10/1995 | Totten et al. | 166/293 |
| 5,547,027 | 8/1996 | Chan et al. | 166/295 |
| 5,559,086 | 9/1996 | Dewprashad et al. | 507/219 |
| 5,588,488 | 12/1996 | Vijn et al. | 166/293 |
| 5,688,844 | 11/1997 | Chatterji et al. | 524/8 |
| 5,692,566 | 12/1997 | Surles | 166/295 |
| 5,738,463 | 4/1998 | Onan | 405/154 |
| 5,795,924 | 8/1998 | Chatterji et al. | 523/130 |
| 5,820,670 | 10/1998 | Chatterji et al. | 106/727 |
| 5,873,413 | 2/1999 | Chatterji et al. | 166/293 |
| 5,875,844 | 3/1999 | Chatterji et al. | 166/293 |
| 5,875,845 | 3/1999 | Chatterji et al. | 166/293 |
| 5,875,846 | 3/1999 | Chatterji et al. | 166/293 |
| 5,911,282 | 6/1999 | Onan et al. | 175/75 |
| 5,913,364 | 6/1999 | Sweatman | 166/281 |
| 5,957,204 | 9/1999 | Chatterji et al. | 166/295 |
| 5,969,006 | 10/1999 | Onan et al. | 523/166 |
| 6,006,835 | 12/1999 | Onan et al. | 166/295 |
| 6,006,836 | 12/1999 | Chatterji et al. | 166/295 |
| 6,059,035 | 5/2000 | Chatterji et al. | 166/293 |
| 6,098,711 | 8/2000 | Chatterji et al. | 166/294 |
| 6,124,246 | 9/2000 | Heathman et al. | 507/219 |

\* cited by examiner

METHODS AND COMPOSITIONS FOR CEMENTING PIPE STRINGS IN WELL BORES

BACKGROUND OF THE INVENTION

1. Field of the Invention

The present invention relates generally to cementing subterranean wells, and more particularly, to cement compositions which set into resilient impermeable solid masses and methods of using the compositions.

2. Description of the Prior Art

Hydraulic cement compositions are commonly utilized in primary cementing operations whereby pipe strings such as casings and liners are cemented in well bores. In performing primary cementing, a hydraulic cement composition is pumped into the annular space between the walls of the well bore and the exterior surfaces of the pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

The cement compositions utilized in primary cementing must often be lightweight to prevent excessive hydrostatic pressures from being exerted on formations penetrated by well bores. A particularly suitable technique for making a hydraulic cement composition lightweight is to foam the cement composition with a gas such as air or nitrogen. In primary cementing, a foamed cement composition provides the additional advantage of being compressible whereby formation fluids are less likely to enter the annulus and flow through the cement composition therein during the transition time of the cement composition, i.e., the time after the placement of a cement composition in the annulus during which the cement composition changes from a true fluid to a hard set mass.

The development of wells including one or more laterals to increase production has recently taken place. Such multi-lateral wells include vertical or deviated (including horizontal) principal well bores having one or more ancillary laterally extending well bores connected thereto. Drilling and completion equipment has been developed which allows multiple laterals to be drilled from a principal cased and cemented well bore. Each of the lateral well bores can include a liner cemented therein which is tied into the principal well bore. The lateral well bores can be vertical or deviated and can be drilled into predetermined producing formations or zones at any time in the productive life cycle of the well.

In both conventional single bore wells and multi-lateral wells having several bores, the cement composition utilized for cementing casing or liners in the well bores must develop high bond strength after setting and also have sufficient resiliency, i.e., elasticity and ductility, to resist loss of pipe or formation bond, cracking and/or shattering as a result of pipe movements, impacts and/or shocks subsequently generated by drilling and other well operations. The bond loss, cracking and/or shattering of the set cement allows leakage of formation fluids through at least portions of the well bore or bores which can be highly detrimental.

The set cement in a well, and particularly the set cement forming a cement sheath in the annulus between a pipe string and the walls of a well bore, often fails due to shear and compressional stresses exerted on the set cement. Such stress conditions are commonly the result of relatively high fluid pressures and/or temperatures inside the cemented pipe string during testing, perforating, fluid injection and/or fluid production. The high internal pipe pressure and/or temperature results in the expansion of the pipe string, both radially and longitudinally, which places stresses on the cement sheath causing it to crack or the cement bonds between the exterior surfaces of the pipe and/or the well bore walls to fail whereby the loss of hydraulic seal in the annulus occurs.

Another condition results from exceedingly high pressures which occur inside the cement sheath due to the thermal expansion of fluids trapped within the cement sheath. This condition often occurs as a result of high temperature differentials created during the injection or production of high temperature fluids through the well bore, e.g., wells subjected to steam recovery or the production of hot formation fluids from high temperature formations. Typically, the pressure of the trapped fluids exceeds the collapse pressure of the cement and pipe causing leaks and bond failure.

Yet another compressional stress condition occurs as a result of outside forces exerted on the cement sheath due to formation shifting, overburden pressures, subsidence and/or tectonic creep.

In multi-lateral wells wherein pipe strings have been cemented in well bores using conventional well cement slurries which set into brittle solid masses, the brittle set cement cannot withstand impacts and shocks subsequently generated by drilling and other well operations carried out in the multiple laterals without cracking or shattering.

The above described failures can result in loss of production, environmental pollution, hazardous rig operations and/or hazardous production operations. The most common hazard is the presence of gas pressure at the well head.

Thus, there are needs for improved well cement compositions and methods whereby after setting, the cement compositions are highly resilient and can withstand the above described stresses without failure. That is, there is a need for well cement compositions and methods whereby the cement compositions have improved mechanical properties including elasticity and ductility and failures due to pipe movement, impacts and shocks are reduced or prevented.

SUMMARY OF THE INVENTION

The present invention provides improved methods of cementing pipe strings in well bores and improved cement compositions that upon setting form resilient solid masses which meet the needs described above and overcome the deficiencies of the prior art. The improved methods of the invention are basically comprised of the steps of preparing an improved cement composition of this invention, introducing the cement composition into the annulus between a pipe string and a well bore and allowing the cement composition to set into a resilient impermeable solid mass therein.

The improved compositions of this invention are basically comprised of a hydraulic cement, an epoxy resin, an epoxy resin hardening agent and sufficient water to form a pumpable slurry. The compositions can also optionally include amorphous silica powder, a dispersing agent, a set retarding agent and other suitable additives well known to those skilled in the art. Further, when required, the densities of the cement compositions can be reduced by foaming the compositions, i.e., including a gas, a foaming agent and a foam stabilizer in the compositions.

It is, therefore, a general object of the present invention to provide improved methods of cementing pipe strings in well bores and improved cement compositions which set into resilient impermeable solid masses.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods and compositions for cementing pipe strings in well bores. The cement compositions have improved resiliency without compromising strength or fatigue resistance. While the methods and compositions are useful in a variety of well completion and remedial operations, they are particularly useful in primary cementing, i.e., cementing casings and liners in well bores.

A non-foamed cement composition of this invention is basically comprised of a hydraulic cement, an epoxy resin, a hardening agent for the epoxy resin and sufficient water to form a pumpable slurry. A variety of hydraulic cements can be utilized in accordance with the present invention including those comprised of calcium, aluminum, silicon, oxygen and/or sulfur which set and harden by reaction with water. Such hydraulic cements include Portland cements, pozzolana cements, gypsum cements, high aluminum content cements, silica cements and high alkalinity cements. Portland cements or their equivalents are generally preferred for use in accordance with the present invention. Portland cements of the types defined and described in *API Specification For Materials And Testing For Well Cements*, API Specification 10, 5th Edition, dated Jul. 1, 1990 of the American Petroleum Institute are particularly suitable. Preferred API Portland cements include classes A, B, C, G and H, with API classes G and H being more preferred and class G being the most preferred.

A variety of hardenable epoxy resins can be utilized in the cement compositions of this invention. Preferred epoxy resins are those selected from the condensation products of epichlorohydrin and bisphenol A. A particularly suitable such resin is commercially available from the Shell Chemical Company under the trade designation "EPON®RESIN 828." This epoxy resin has a molecular weight of about 340 and a one gram equivalent of epoxide per about 180 to about 195 grams of resin. Another suitable epoxy resin is an epoxidized bisphenol A novolac resin which has a one gram equivalent of epoxide per about 205 grams of resin.

For ease of mixing, the epoxy resin utilized is preferably pre-dispersed in a non-ionic aqueous fluid. A non-ionic aqueous dispersion of the above described condensation product of epichlorohydrin and bisphenol A is commercially available from the Shell Chemical Company under the trade designation "EPI-REZ®-3510-W-60." Another non-ionic aqueous dispersion of an epoxy resin comprised of a condensation product of epichlorohydrin and bisphenol A having a higher molecular weight than the above described resin is also commercially available from the Shell Chemical Company under the trade designation "EPI-REZ®-3522-W-60." The above mentioned epoxidized bisphenol A novolac resin is commercially available in a non-ionic aqueous dispersion from the Shell Chemical Company under the trade designation "EPI-REZ®-5003-W-55." Of the foregoing non-ionic aqueous dispersions of epoxy resins, the aqueous dispersion of the condensation product of epichlorohydrin and bisphenol A having a molecular weight of about 340 and a one gram equivalent of epoxide per about 180 to about 195 grams of resin is the most preferred.

The epoxy resin utilized is included in the compositions of this invention in an amount in the range of from about 5% to about 20% by weight of hydraulic cement in the composition, most preferably in an amount of about 8% to about 10%.

A variety of hardening agents, including, but not limited to, aliphatic amines, aliphatic tertiary amines, aromatic amines, cycloaliphatic amines, heterocyclic amines, amidoamines, polyamides, polyethyleneamines and carboxylic acid anhydrides can be utilized in the compositions of this invention containing the above described epoxy resins. Of these, aliphatic amines, aromatic amines and carboxylic acid anhydrides are the most suitable.

Examples of aliphatic and aromatic amine hardening agents are triethylenetetraamine, ethylenediamine, N-cocoalkyltri-methylenediamine, isophoronediamine, diethyltoluenediamine, and tris (dimethylaminomethylphenol). Examples of suitable carboxylic acid anhydrides are methyltetrahydrophthalic anhydride, hexahydrophthalic anhydride, maleic anhydride, polyazelaic polyanhydride and phthalic anhydride. Of these, triethylenetetraamine, ethylenediamine, N-cocoalkyltri-methylenediamine, isophoronediamine, diethyltoluenediamine and tris (dimethylaminomethylphenol) are preferred, with isophoronediamine, diethyltoluenediamine and tris (dimethylaminomethylphenol) being the most preferred.

The hardening agent or agents utilized are generally included in the cement compositions of this invention in an amount in the range of from about 0.01% to about 0.02% by weight of hydraulic cement in the compositions.

The water in the cement compositions which is in addition to the water contained in the non-ionic aqueous dispersions of epoxy resin is included in the compositions to make the compositions pumpable. The water can be from any source provided it does not contain compounds that adversely effect other components in the cement compositions. However, fresh water is preferred. Generally, water is present in the compositions in an amount in the range of from about 20% to about 45% by weight of the hydraulic cement in the compositions, more preferably in the range of from about 25% to about 30%.

Another component which can optionally be included in the cement compositions of this invention is a set retarding agent. Set retarding agents are included in a cement composition when it is necessary to extend the time in which the cement composition can be pumped so that it will not thicken or set prior to being placed in a desired location in the well being cemented. Examples of set retarding agents which can be used include lignosulfonates such as calcium and sodium lignosulfonate, such lignosulfonates modified by reaction with formaldehyde and sodium bisulfite, organic acids such as tartaric acid and gluconic acid, a copolymer or copolymer salt of 2-acrylamido-2-methyl propane sulfonic acid and acrylic acid and others. A particularly suitable set retarding agent for use in the cement compositions of the present invention is calcium lignosulfonate modified by reaction with formaldehyde and sodium bisulfite. This set retarding agent is commercially available under the trade name "HR-6L™" from Halliburton Energy Services, Inc. of Duncan, Okla.

The proper amount of set retarding agent required for particular conditions can be determined by conducting a thickening time test for the particular set retarding agent and cement composition. Such tests are described in the *API Specification For Materials And Testing For Well Cements*, API Specification 10, mentioned above. Generally, the set retarding agent utilized is added to a cement composition of this invention in an amount in the range of from about 0.1% to about 3% by weight of hydraulic cement in the composition.

Other components which can optionally be included in the cement compositions of this invention are amorphous silica powder and a dispersing agent. The amorphous silica powder improves the compressive strength and other mechanical properties of the cement composition and the dispersing agent facilitates the dispersion of the amorphous silica powder and other solids in the compositions.

Suitable amorphous silica powder which can be utilized is commercially available under the trade designation "SILICALITE™" from Halliburton Energy Services, Inc. of Duncan, Okla. While various dispersing agents can be utilized, a particularly suitable such dispersing agent is comprised of the condensation reaction product of formaldehyde, acetone and sodium bisulfite. This dispersing agent is commercially available under the trade designation "CFR-3™" from Halliburton Energy Services, Inc. of Duncan, Okla.

When used, the amorphous silica powder is included in the cement compositions of this invention in an amount in the range of from about 10% to about 20% by weight of hydraulic cement in the compositions. The dispersing agent used is included in the composition in an amount in the range of from about 0.05% to about 1% by weight of hydraulic cement therein.

The above described non-foamed cement compositions of this invention can be foamed by combining a compressible gas with the compositions in an amount sufficient to foam the compositions and produce a desired density along with an effective amount of a foaming agent and an effective amount of a foam stabilizer. As mentioned above, the presence of a compressible gas in the cement compositions helps prevent pressurized formation fluid influx into the cement compositions while they are setting and contributes to the resiliency of the set cement compositions.

The gas utilized is preferably selected from nitrogen and air, with nitrogen being the most preferred. Generally, the gas is present in an amount sufficient to foam the cement compositions and produce a cement composition density in the range of from about 10 to about 16 pounds per gallon, more preferably from about 12 to about 14 pounds per gallon.

The foaming agent functions to facilitate foaming. Suitable foaming agents are surfactants having the general formula:

$$H(CH_2)_a(OC_2H_4)_bOSO_3X$$

wherein:
a is an integer in the range of from about 5 to about 15;
b is an integer in the range of from about 1 to about 10; and
X is any compatible cation.

A particularly preferred foaming agent of the above type is a surfactant having the formula:

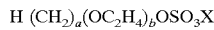

wherein:
a is an integer in the range of from about 6 to about 10.

This surfactant is commercially available under the trade designation "CFA-S™" from Halliburton Energy Services, Inc. of Duncan, Okla.

Another particularly preferred foaming agent of the above mentioned type is a surfactant having the formula:

wherein:
a is an integer in the range of from about 5 to about 15; and
b is an integer in the range of from about 1 to about 10.

This surfactant is commercially available under the trade name "HALLIBURTON FOAM ADDITIVE™" from Halliburton Energy Services, Inc. of Duncan, Okla.

Another foaming agent which can be utilized in the cement compositions of this invention includes polyethoxylated alcohols having the formula:

$$H(CH_2)_a(OC_2H_4)_bOH$$

wherein:
a is an integer in the range of from about 10 to about 18; and
b is an integer in the range of from about 6 to about 15.

This surfactant is available from Halliburton Energy Services under the trade name "AQF-1™."

Yet another foaming agent which can be used is a sodium salt of alpha-olefinic sulfonic acid (AOS) which is a mixture of compounds of the formulas:

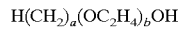

and

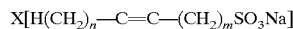

wherein:
n and m are individually integers in the range of from about 6 to about 16;
p and q are individually integers in the range of from about 7 to about 17; and
X and Y are fractions with the sum of X and Y being 1.

This foaming agent is available from Halliburton Energy Services under the trade name "AQF-2™."

Still another foaming surfactant which can be used is an alcohol ether sulfate of the formula:

wherein:
a is an integer in the range of from about 6 to about 10; and
b is an integer in the range of from about 3 to about 10.

The particular foaming agent employed will depend on various factors such as the types of formations in which the foamed cement is to be placed. Generally, the foaming agent utilized is included in a cement composition of this invention in an amount in the range of from about 1.5% to about 10% by weight of water in the composition. When the foaming agent is one of the preferred surfactants described above, it is included in the composition in an amount in the range of from about 3% to about 5% by weight of water therein.

A foam stabilizer is also included in the foamed cement compositions to enhance the stability of the foam. One such foam stabilizing agent is a compound of the formula:

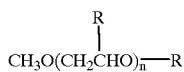

wherein:

R is hydrogen or a methyl radical; and n is an integer in the range of from about 20 to about 200.

A particularly preferred foam stabilizing agent of the above type is a methoxypolyethylene glycol of the formula:

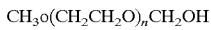

wherein:

n is in the range of from about 100 to about 150.

This foam stabilizing agent is commercially available from Halliburton Energy Services under the trade designation "HALLIBURTON FOAM STABILIZER™."

The most preferred foam stabilizing agent is an amidopropylbetaine having the formula:

wherein:

R is a $C_{10}$ to $C_{18}$ saturated aliphatic hydrocarbon group, an oleyl group or a linoleyl group.

A particularly suitable stabilizing agent of the above type is a cocoylamidopropylbetaine. This foam stabilizing agent is commercially available from Halliburton Energy Services under the trade designation "HC-2™."

The foam stabilizer is generally included in a cement composition of this invention in an amount in the range of from about 0.75% to about 5% by weight of water therein. When the foam stabilizing agent is one of the particularly preferred agents described above, it is preferably present in the composition in an amount in the range of from about 1.5% to about 2.5% by weight of water.

Thus, an improved well cement composition of this invention is comprised of a hydraulic cement, an epoxy resin selected from the group of a condensation reaction product of epichlorohydrin and bisphenol A and an epoxidized bisphenol A novolac resin present in an amount in the range of from about 8% to about 10% by weight of hydraulic cement in the composition, a hardening agent for the epoxy resin selected from the group of aliphatic amines, aromatic amines and carboxylic acid anhydrides present in an amount in the range of from about 0.01% to about 0.02% by weight of hydraulic cement in the composition, and sufficient water to form a pumpable slurry.

Another composition of the present invention is comprised of a hydraulic cement, an epoxy resin selected from the group of a condensation reaction product of epichlorohydrin and bisphenol A and an epoxidized bisphenol A novolac resin present in an amount in the range of from about 8% to about 10% by weight of hydraulic cement in the composition, a hardening agent for the epoxy resin selected from the group of aliphatic amines, aromatic amines and carboxylic acid anhydrides present in the composition in an amount in the range of from about 0.01% to about 0.02% by weight of hydraulic cement in the composition, a set retarding agent, e.g., an alkali metal or alkaline earth metal lignosulfonate modified by reaction with formaldehyde and sodium bisulfite, present in an amount in the range of from about 0.1% to about 3% by weight of hydraulic cement in the composition, amorphous silica powder present in an amount in the range of from about 10% to about 20% by weight of hydraulic cement in the composition, a dispersing agent, e.g., the condensation reaction product of formaldehyde, acetone and sodium bisulfite, present in an amount in the range of from about 0.05% to about 1% by weight of hydraulic cement in the composition and sufficient water to form a pumpable slurry.

Yet another composition of this invention is comprised of a hydraulic cement, an epoxy resin selected from the group of a condensation reaction product of epichlorohydrin and bisphenol A and an epoxidized bisphenol A novolac resin present in an amount in the range of from about 8% to about 10% by weight of hydraulic cement in the composition, a hardening agent for said epoxy resin selected from the group of aliphatic amines, aromatic amines and carboxylic acid anhydrides present in an amount in the range of from about 0.01% to about 0.02% by weight of hydraulic cement in the composition, water present in an amount of about 25% to about 35% by weight of hydraulic cement in the composition, a gas present in an amount sufficient to form a foam having a density in the range of from about 12 to about 14 pounds per gallon, a foaming agent, e.g., a sodium salt of alpha-olefinic sulfonic acid, present in an amount in the range of from about 3% to about 5% by weight of water in the composition and a foam stabilizer, e.g., cocoylamidopropylbetaine, present in an amount in the range of from about 1.5% to about 2.5% by weight of water in the composition.

Still another composition of this invention is comprised of a hydraulic cement, an epoxy resin selected from the group of a condensation reaction product of epichlorohydrin and bisphenol A and an epoxidized bisphenol A novolac resin present in an amount in the range of from about 8% to about 10% by weight of hydraulic cement in the composition, a hardening agent for the epoxy resin selected from the group of aliphatic amines, aromatic amines and carboxylic acid anhydrides present in an amount in the range of from about 0.01% to about 0.02% by weight of hydraulic cement in the composition, water present in an amount in the range of from about 25% to about 35% by weight of hydraulic cement in the composition, a set retarding agent, e.g., an alkali metal or alkaline earth metal lignosulfonate modified by reaction with formaldehyde and sodium bisulfite, present in an amount in the range of from about 0.1% to about 3% by weight of hydraulic cement in the composition, amorphous silica powder present in an amount in the range of from about 10% to about 20% by weight of hydraulic cement in the composition, a dispersing agent, e.g., the condensation reaction product of formaldehyde, acetone and sodium bisulfite, present in an amount in the range of from about 0.05% to about 1% by weight of hydraulic cement in the composition, a gas selected from the group of air and nitrogen present in an amount sufficient to foam the cement composition, an effective amount of a foaming agent, e.g., the sodium salt of an alpha-olefinic sulfonic acid, present in an amount in the range of from about 3% to about 5% by weight of water in the composition and a foam stabilizer, e.g., cocoylamidopropylbetaine, present in an amount in the range of from about 1.5% to about 2.5% by weight of water therein.

As mentioned, the improved methods of the present invention for cementing a pipe string in a well bore are basically comprised of preparing a cement composition of the present invention as described above, introducing the cement composition into the annulus between a pipe string and a well bore and allowing the cement composition to set into a resilient impermeable mass.

In order to further illustrate the methods and compositions of this invention, the following examples are given.

EXAMPLE 1

An unfoamed composition of the present invention having a density of 16.4 pounds per gallon was prepared by mixing 720 grams of Premium cement with 234.6 grams of water, 58.6 grams of a non-ionic aqueous dispersion of an epoxy resin and 0.9 grams of a hardening agent for the epoxy resin. The cement composition was divided into test samples and various quantities of a set retarding agent were added to some of the test samples.

i.e., a cocoylamidopropylbetaine to the test samples in an amount of 0.83% by weight of water.

The test samples of the compositions of the present invention described above were tested for thickening times at 140° F. in accordance with the procedures set forth in the API Specification 10 mentioned above. The components and their quantities in the various cement composition test samples described above as well as the results of the thickening time tests are given in Table I below.

TABLE I

Cement Composition Test Sample Components, Quantities and Thickening Times

| Cement Composition Test Sample No. | Unfoamed Density, lb/gal | Foamed Density, lb/gal | Set Retarding Agent[1], % by weight of cement | Epoxy Resin[2], % by weight of cement | Epoxy Resin[3], % by weight of cement | Hardening Agent[4], % by weight of cement | Dispersing Agent[5], % by weight of cement | Amorphous Silica Powder[6], % by weight of cement | Thickening Time @ 140° F., Hr:Min |
|---|---|---|---|---|---|---|---|---|---|
| 1 | 16.4 | — | 0.32 | 7.2 | — | 1.0 | — | — | 3:05 |
| 2 | 16.4 | — | — | — | 7.2 | 0.86 | — | — | 3:15 |
| 3 | 16.4 | — | 0.32 | — | 7.2 | 1.0 | 0.062 | 10 | 2:35 |
| 4 | 16.4 | — | 0.10 | — | — | — | 0.062 | 10 | — |
| 5 | 16.4 | — | 0.10 | — | — | — | 0.062 | — | — |
| 6 | — | 14 | 0.32 | 7.2 | — | 1.0 | — | — | 3:45 |
| 7 | — | 14 | — | — | 7.2 | 0.86 | — | — | 3:29 |
| 8 | — | 14 | 0.32 | 7.2 | — | 1.0 | 0.062 | 10 | 2:45 |
| 9 | — | 14 | 0.10 | — | 7.2 | 0.86 | 0.062 | 10 | 1:48 |
| 10 | — | 14 | 0.10 | — | — | — | 0.062 | 10 | — |
| 11 | — | 14 | 0.10 | — | — | — | 0.062 | — | — |

[1]Calcium lignosulfate modified by reaction with formaldehyde and sodium bisulfite.
[2]Non-ionic aqueous dispersion of condensate product of epichlorohydrin and bisphenol A ("Shell Chemical EPI-REZ ® 3510-W-60").
[3]Non-ionic aqueous dispersion of epoxidized bisphenol A novolac resin (Shell Chemical "EPI-REZ ® 5003-W-55").
[4]Diethyltoluenediamine (Shell Chemical "EPI-CURE ® W").
[5]Condensation product of formaldehyde, acetone and sodium bisulfite (Halliburton "CFR-3 ™").
[6]Halliburton "Silicalite ™"

A second unfoamed cement composition of the invention having a density of 16.4 pounds per gallon was prepared by combining 720 grams of Premium cement with 252.8 grams of water, 0.5 grams of a dispersing agent and 80 grams of amorphous silica powder. This cement slurry was also divided into test samples and a set retarding agent was added to some of the test samples.

Foamed cement composition test samples were prepared by first mixing 720 grams of premium cement with 234.6 grams of water, 58.6 grams of an aqueous dispersion of an epoxy resin and 0.9 grams of a hardening agent. This cement slurry having a density of 16.4 pounds per gallon was divided into test samples and a set retarding agent was added to some of the test samples. The test samples were then foamed to a density of 14 pounds per gallon with air after combining a foaming agent, i.e., a sodium salt of an alpha-olefinic sulfonic acid, in an amount of about 1.67% by weight of water and a foam stabilizer, i.e., a cocoylamidopropylbetaine, in an amount of 0.83% by weight of water with the test samples.

Additional foamed cement composition test samples were prepared by mixing 720 grams of premium cement with 252.8 grams of water, 0.5 grams of a dispersing agent and 80 grams of amorphous silica powder. The resulting cement slurry having a density of 16.4 pounds per gallon was divided into test samples and various amounts of a set retarder were added to some of the test samples. The test samples were next foamed with air to a density of 14 pounds per gallon after adding a foaming agent, i.e., a sodium salt of an alpha-olefinic sulfonic acid, to the test samples in an amount of 1.67% by weight of water and a foam stabilizer, From Table I it can be seen that the thickening times of the compositions of the present invention are within acceptable limits for cementing pipe strings in well bores.

The cement composition test samples described above were cured for 72 hours at 140° F. Thereafter, Young's moduli, Poisson's ratios and compressive strengths were determined under 0, 500, 1,000 and 2,000 psi confining pressures. The cement composition test samples were also tested for Brazilian tensile strengths and Mohr-Coulomb failure envelopes were created. The results of these tests are set forth in Table II below.

TABLE II

Medical Properties of Hardened Cement Composition Test Samples

| Cement Composition Test Sample No. | Confining Pressure, psi | Compressive Strength, psi | Tensile Strength, psi | Young's Modulus, 10⁶ psi | Poisson's Ratio | Friction Angle, degrees |
|---|---|---|---|---|---|---|
| 1 | 0 | 9852 | 454 | 1.4 | 0.14 | 26.5 |
|   | 500 | 8634 |  | 1.4 | 0.20 |  |
|   | 1000 | 9919 |  | 1.4 | 0.23 |  |
|   | 2000 | 11532 |  | 1.0 | 0.19 |  |
| 2 | 0 | 8524 | 432 | 1.6 | 0.15 | 28 |
|   | 500 | 8247 |  | 1.3 | 0.20 |  |
|   | 1000 | 7696 |  | 0.74 | 0.14 |  |
|   | 2000 | 12557 |  | 1.1 | 0.16 |  |
| 3 | 0 | 8869 | 487 | 1.5 | 0.16 | 26 |
|   | 500 | 10047 |  | 1.4 | 0.13 |  |

TABLE II-continued

Medical Properties of Hardened Cement Composition Test Samples

| Cement Composition Test Sample No. | Confining Pressure, psi | Compressive Strength, psi | Tensile Strength, psi | Young's Modulus, $10^6$ psi | Poisson's Ratio | Friction Angle, degrees |
|---|---|---|---|---|---|---|
|  | 1000 | 11584 |  | 1.4 | 0.21 |  |
|  | 2000 | 13896 |  | 1.4 | 0.27 |  |
| 4 | 0 | 8832 | 390 | 1.6 | 0.14 | 26.75 |
|  | 500 | 10258 |  | 1.2 | 0.24 |  |
|  | 1000 | 11958 |  | 1.3 | 0.19 |  |
|  | 2000 | 13258 |  | 0.93 | 0.20 |  |
| 5 | 0 | 8956 | 467 | 1.7 | 0.14 | 27 |
|  | 500 | 10401 |  | 1.5 | 0.29 |  |
|  | 1000 | 12166 |  | 1.6 | 0.28 |  |
|  | 2000 | 14419 |  | 1.4 | 0.23 |  |
| 6 | 0 | 2712 | 247 | 1.2 | 0.13 | 34 |
|  | 500 | 4825 |  | 0.88 | 0.18 |  |
|  | 1000 | 4978 |  | 0.75 | 0.20 |  |
|  | 2000 | 9719 |  | 1.3 | 0.16 |  |
| 7 | 0 | 3122 | 286 | 1.0 | 0.13 | 12 |
|  | 500 | 3938 |  | 0.75 | 0.13 |  |
|  | 1000 | 5297 |  | 0.95 | 0.16 |  |
|  | 2000 | 6198 |  | 0.84 | 0.12 |  |
| 8 | 0 | 4669 | 262 | 0.87 | 0.13 | 14.5 |
|  | 500 | 5094 |  | 0.95 | 0.25 |  |
|  | 1000 | 6031 |  | 1.1 | 0.17 |  |
|  | 2000 | 7849 |  | 1.0 | 0.16 |  |
| 9 | 0 | 3922 | 234 | 0.87 | 0.14 | 8 |
|  | 500 | 4607 |  | 0.81 | 0.25 |  |
|  | 1000 | 5338 |  | 0.58 | 0.16 |  |
|  | 2000 | 6490 |  | 0.14 | 0.18 |  |
| 10 | 0 | 3833 | 343 | 1.0 | 0.15 | 24.5 |
|  | 500 | 5562 |  | 1.0 | 0.24 |  |
|  | 1000 | 6600 |  | 0.74 | 0.20 |  |
|  | 2000 | 8098 |  | 0.37 | 0.11 |  |
| 11 | 0 | 3088 | 290 | 0.75 | 0.13 | 21.1 |
|  | 500 | 4074 |  | 0.78 | 0.23 |  |
|  | 1000 | 5440 |  | 0.86 | 0.21 |  |
|  | 2000 | 7364 |  | 0.72 | 0.18 |  |

As shown in Table II, unfoamed cement Composition Test Sample No. 3 performed better than the other unfoamed test samples which included epoxy resin and hardening agent. The compressive strengths were nearly the same as unfoamed cement composition test samples 4 and 5 which did not include epoxy resin and hardening agent (hereinafter referred to as "neat test samples"). The elastic properties of Test Sample No. 3 were lower, i.e., Test Sample No. 3 had an average Young's modulus of $1.43 \times 10^6$ psi versus an average Young's modulus of $1.53 \times 10^6$ psi for a neat test sample, i.e., Test Sample No. 5. Poisson's ratio for the test samples containing epoxy resin and hardening agent, i.e., Test Samples Nos. 1, 2 and 3 was an average of 0.18 which is significantly lower then 0.24 for Test Sample No. 5. Test Sample No. 1 which is similar to Test Sample No. 3 did not include amorphous silica powder and a dispersing agent. Test Sample No. 1 performed as well as Test Sample No. 3 at lower confinements, but had a somewhat lower strength at higher confinements. The other test samples containing epoxy resin and hardening agent (Test Sample Nos. 2 and 3) showed similar Young's moduli and Poisson's ratios which means that the inclusion of epoxy resin and hardening agent in the cement composition imparts improved elasticity.

Poisson's ratio is a measure of a body's strain growth orthogonal to the direction of applied stress. The results shown in Table II indicate that the cement compositions containing epoxy resin and hardening agent will have better shear bonds with a pipe string because it will be less flexible in lateral directions during loading of the pipe string. Tectonic creep and subsidence of rock formations cause increased stress loading and considerable displacement around the well bore. The lower Poisson's ratios of the test samples including epoxy resin and hardening agent indicate that the set cement compositions of this invention will maintain their original shapes. The low Young's moduli indicate that the cement compositions will be more flexible in situations where there are large changes in loading. Another benefit is the apparent proclivity of a number of the test samples including epoxy resin and hardening agent towards high toughness, allowing a large amount of plastic creep.

As also shown in Table II, the angles of internal friction from the Mohr-Coulomb shear failure envelopes are 20° to 30° which is in the range of more elastic rock. The angle of internal friction is often a measure of a material's shear tendency. A steep angle is interpreted as a stiff, brittle material with high shear strength. The lower the angle of internal friction, the lower shear strength and less stable is the tested material under eccentric or changing compressive loads. Moderate angles of internal friction such as those observed for the various cement compositions including epoxy resin and hardening agent shown in Table II indicate a more malleable, flexible material with reasonable toughness. of the foamed cement composition test samples containing epoxy resin and hardening agent, Test Sample No. 8 (equivalent to unfoamed Test Sample No. 3) performed best. It was better than the neat Test Sample No. 11, but slightly weaker than the neat Test Sample No. 10 which contained amorphous silica powder and dispersing agent. The Mohr-Coulomb failure envelope friction angles are also considered to be of high quality. Thus, the unfoamed and foamed cement compositions of this invention containing epoxy resin and hardening agent can withstand a variety of loading conditions. The cement compositions are particularly suitable for cementing pipe strings in well bores and in multilateral junctions which undergo rigorous cyclic loading, often in the form of impacts and shocks. In addition, the resilient set cement compositions of this invention have a better resistance to the effects of drawdown and depletion of formations surrounding the well bore as well as to subsidence and tectonic creep which often cause well bore failure and casing collapse.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved method of cementing a pipe string in a well bore comprising the steps of:
   (a) preparing a cement composition comprised of a hydraulic cement, an epoxy resin selected from the group consisting of a condensation reaction product of epichlorohydrin and bisphenol A and an epoxidized bisphenol A novolac resin, a hardening agent for said epoxy resin, sufficient water to form a pumpable slurry, a gas, a foaming agent and a foam stabilizer;
   (b) introducing said cement composition into the annulus between said pipe string and said well bore; and
   (c) allowing said cement composition to set into a resilient impermeable solid mass.

2. The method of claim 1 wherein said hydraulic cement in said composition is a Portland cement or the equivalent thereof.

3. The method of claim 1 wherein said epoxy resin in said composition is present in an amount in the range of from about 5% to about 20% by weight of hydraulic cement therein.

4. The method of claim 1 wherein said hardening agent in said composition is at least one member selected from the group of aliphatic amines, aromatic amines and carboxylic acid anhydrides and is present in an amount in the range of from about 0.01% to about 0.02% by weight of hydraulic cement therein.

5. The method of claim 1 wherein said composition further comprises a set retarding agent present in an amount in the range of from about 0.1% to about 3% by weight of hydraulic cement therein.

6. The method of claim 1 wherein said composition further comprises amorphous silica powder present in an amount in the range of from about 10% to about 20% by weight of hydraulic cement therein.

7. The method of claim 1 wherein said composition further comprises a dispersing agent present in an amount in the range of from about 0.05% to about 1% by weight of hydraulic cement in said composition.

8. The method of claim 1 wherein said gas in said composition is selected from the group of air and nitrogen and is present in said composition in an amount sufficient to produce a composition density in the range of from about 10 to about 16 pounds per gallon.

9. The method of claim 1 wherein said foaming agent in said composition is selected from the group of foaming agents comprised of the sodium salts of alpha-olefinic sulfonic acids and mixtures thereof and is present in an amount in the range of from about 3% to about 5% by weight of water in said composition.

10. The method of claim 1 wherein said foam stabilizer in said composition is selected from the group of foam stabilizers having the formula $R-CONHCH_2CH_2CH_2N^+(CH_3)_2CH_2CO_2$ wherein R is a $C_{10}$–$C_{18}$ saturated aliphatic group, an oleyl group or a linoleyl group and is present in an amount in the range of from about 1.5% to about 2.5% by weight of water in said composition.

* * * * *

UNITED STATES PATENT AND TRADEMARK OFFICE
CERTIFICATE OF CORRECTION

PATENT NO. : 6,244,344 B1
DATED : June 12, 2001
INVENTOR(S) : Jiten Chatterji et al.

Page 1 of 1

It is certified that error appears in the above-identified patent and that said Letters Patent is hereby corrected as shown below:

<u>Column 10,</u>
Table II, delete [Medical] and insert therefore -- Mechanical --.

Signed and Sealed this

Fourteenth Day of May, 2002

Attest:

Attesting Officer

JAMES E. ROGAN
Director of the United States Patent and Trademark Office